(12) United States Patent
Adiba et al.

(10) Patent No.: US 7,330,860 B2
(45) Date of Patent: Feb. 12, 2008

(54) FAULT TOLERANT MECHANISM TO HANDLE INITIAL LOAD OF REPLICATED OBJECT IN LIVE SYSTEM

(75) Inventors: Nicolas G. Adiba, San Jose, CA (US); Serge Bourbonnais, Palo Alto, CA (US); Elizabeth B. Hamel, Morgan Hill, CA (US); Somil Kulkarni, San Jose, CA (US); Bruce G. Lindsay, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 406 days.

(21) Appl. No.: 10/789,326

(22) Filed: Feb. 26, 2004

(65) Prior Publication Data

US 2005/0193039 A1    Sep. 1, 2005

(51) Int. Cl.
*G06F 12/00* (2006.01)
*G06F 17/30* (2006.01)
(52) U.S. Cl. ...................... 707/204; 707/202
(58) Field of Classification Search ............... 707/204, 707/201–202
See application file for complete search history.

(56) References Cited

U.S. PATENT DOCUMENTS

| 5,787,247 A * | 7/1998 | Norin et al. ............... 709/220 |
| 5,806,075 A | 9/1998 | Jain et al. |
| 6,438,558 B1 | 8/2002 | Stegelmann |
| 6,526,417 B1 * | 2/2003 | Perry ........................ 707/202 |
| 6,594,676 B1 * | 7/2003 | Moore ...................... 707/202 |
| 6,668,260 B2 | 12/2003 | Zoltan |
| 6,934,727 B2 * | 8/2005 | Berkowitz et al. ....... 715/500.1 |
| 7,003,531 B2 * | 2/2006 | Holenstein et al. ........ 707/201 |

* cited by examiner

*Primary Examiner*—Wilson Lee
*Assistant Examiner*—Cheryl M Shechtman
(74) *Attorney, Agent, or Firm*—Sawyer Law Group LLP

(57) ABSTRACT

An automatic initial data load to a new table copy concurrently with active replication to existing table copies in an asynchronous replication group includes: initiating a data load of the new table copy; creating spill queue(s) at the new table copy; loading the data from a source table copy to the new table copy, where changes for the active table copies are applied during the loading, but changes to the new table copy are stored in a spill storage area; applying the changes in the spill storage area to the new table copy after the loading of the data is done; and removing the spill storage area after the changes have been applied to the new table copy. Thus, a new table copy is initialized into the replication group without requiring that replication be suspended at the source or any of the existing table copies during the initializing process.

17 Claims, 5 Drawing Sheets

FAULT TOLERANT MECHANISM TO HANDLE INITIAL LOAD OF REPLICATED OBJECT IN LIVE SYSTEM

FIELD OF THE INVENTION

The present invention relates to database systems, and more particularly to the initial load of a new table copy in the asynchronous replication of databases.

BACKGROUND OF THE INVENTION

It is known in the art that asynchronous transactional replication can be used to maintain one or more copies of a source object (for example, a relational table managed by a relational database management system, but can also be stored procedures calls or other objects managed by the database). The source table copies are updated through ACID transactions (Atomicity, Consistency, Isolation and Durability), modifying one or more source tables. Typically in a relational database, changes made by transactions are written to a file called the recovery log before they are applied on the actual tables. This ensures that the tables are updated even in the eventuality of a hardware or software failure.

A typical replication solution has a capture program ("Capture") and an apply program ("Apply") at each node. Capture reads changes of committed transactions from the recovery log at a source node and sends them to Apply running on a target node. The target node then re-executes the changes of the transactions. By re-executing transaction changes on the target node, this solution guarantees that the target table copies are always a valid image of the source table copy, even though the images may lag behind in time, because of the time required to propagate and apply the changes.

When a new table copy is to be added to an existing replication group where table changes are replicated/grouped in their original transaction, the new table copy must first be initialized and loaded with the current data in the replication group before participating in the asynchronous replication. One conventional approach to the initialization of the new table copy is to assume that the user performs the initial load. The replication software is then started once the load is over. This requires that changes to the table copy being loaded must be suspended at the source table and the other table copies. Another conventional approach allows the source table to be modified during the load, but suspends application of changes for the other active table copies in the replication group until the completion of the load process. Since a load process can take a long time, this interruption of the replication service is significant.

Accordingly, there exist a need for a method and system for an automatic initial load of data to a new table copy concurrently with active replication to existing table copies. The method and system should not require that replication be suspended at the source or any of the existing table copies during the load process. The present invention addresses such a need.

SUMMARY OF THE INVENTION

An automatic initial data load to a new table copy concurrently with active replication to existing table copies in an asynchronous replication group includes: initiating a data load of the new table copy; creating a spill storage area at the new table copy; loading the data from a source table copy to the new table copy, where changes for the active table copies are applied during the loading, but changes to the new table copy are stored in the spill storage area; applying the changes in the spill storage area to the new table copy after the loading of the data is done; and removing the spill storage area after the changes in the spill queue(s) have been applied to the new table copy. Thus, a new table copy is initialized into the replication group without requiring that replication be suspended at the source or any of the existing table copies during the initializing process.

DETAILED DESCRIPTION

The present invention provides a method and system for an automatic initial load of data to a new table copy concurrently with active replication to existing table copies. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 5 in conjunction with the discussion below.

Figure 1:
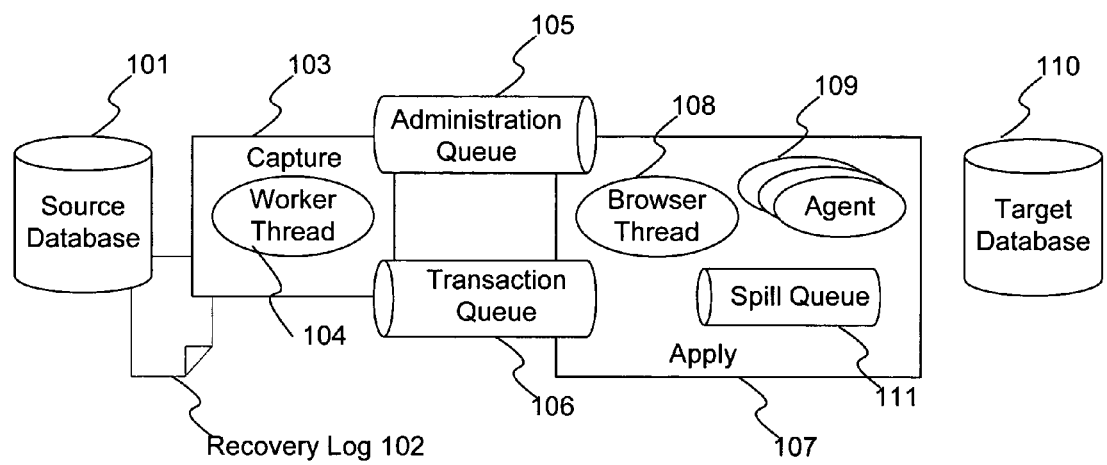
FIG. 1 illustrates an embodiment of a system for an automatic initial load of data to a new table copy concurrently with active replication to existing table copies in accordance with the present invention.

FIG. 1 illustrates an embodiment of a system for an automatic initial load of data to a new table copy concurrently with active replication to existing table copies in accordance with the present invention. The system includes a source database 101 and a target database 110. Changes to table copies at the source database 101 are recorded in the recovery log 102. At the source database 101 is a Capture program 103 ("Capture"), which reads changes of transactions from the recovery log 102 and publishes them onto an unidirectional persistent message queue called the "transaction queue" 106. At the target database 110 is an Apply program 107 ("Apply"), which dequeues those message and re-plays the changes of these transactions contained in the messages onto the target database 110. Capture 103 and Apply 107 communicate through asynchronous messages and don't assume that the other program is running. Apply 107 can communicate back to Capture 103 using an "administration queue" 105.

Each replicated table copy is "subscribed" to Capture 103 and Apply 107 so that these programs know the name of the source table copy, target table copy, message queue to use, and the status of the replication (not replicating, replicating, loading). This meta data called a "subscription" can be saved into database tables both at the source database 101 and at the target database 110. All table changes sent over the same queue are grouped in their original transaction.

In this embodiment, Apply 107 can read from multiple queues assuming that each queue is coming from a different source database and tries to re-apply non-dependent transactions in parallel when possible. A transaction is dependent on another if the transactions modify the same row in a table. Apply 107 has one thread per incoming queue called a "browser" thread 108. The browser thread 108 reads incoming messages, performs transaction dependency analysis, and hands over the transactions eligible to be applied to a pool of threads called the "agent" threads 109. An agent thread 109 takes ownership of a transaction free of any dependencies on earlier transactions to be applied, and applies the changes of the transaction on the target database 110 to modify the target table copies. The browser thread 108 makes a transaction eligible to be applied by reporting them in an internal data structure called the "work queue" (not shown), which is a FIFO (first in first out) list. The agent threads 109 give back transactions that have been successfully applied to the browser thread 108 using a similar FIFO list called the "done queue" (not shown).

Commands, such as start/stop capturing changes for a given table copy, are sent to Capture 103 using signals. A signal is a row inserted into a special table called the "signal table". It specifies an action (such as start capturing changes, stop capturing changes), and a target subscription. Capture 103 monitors any row inserted into the signal table by looking at the recovery log 102. This allows commands to be sent to Capture 103 that are synchronous to the changes occurring to the database. At a given point in time, changes read from the recovery log 102 are lagging behind the current time.

Figure 2:
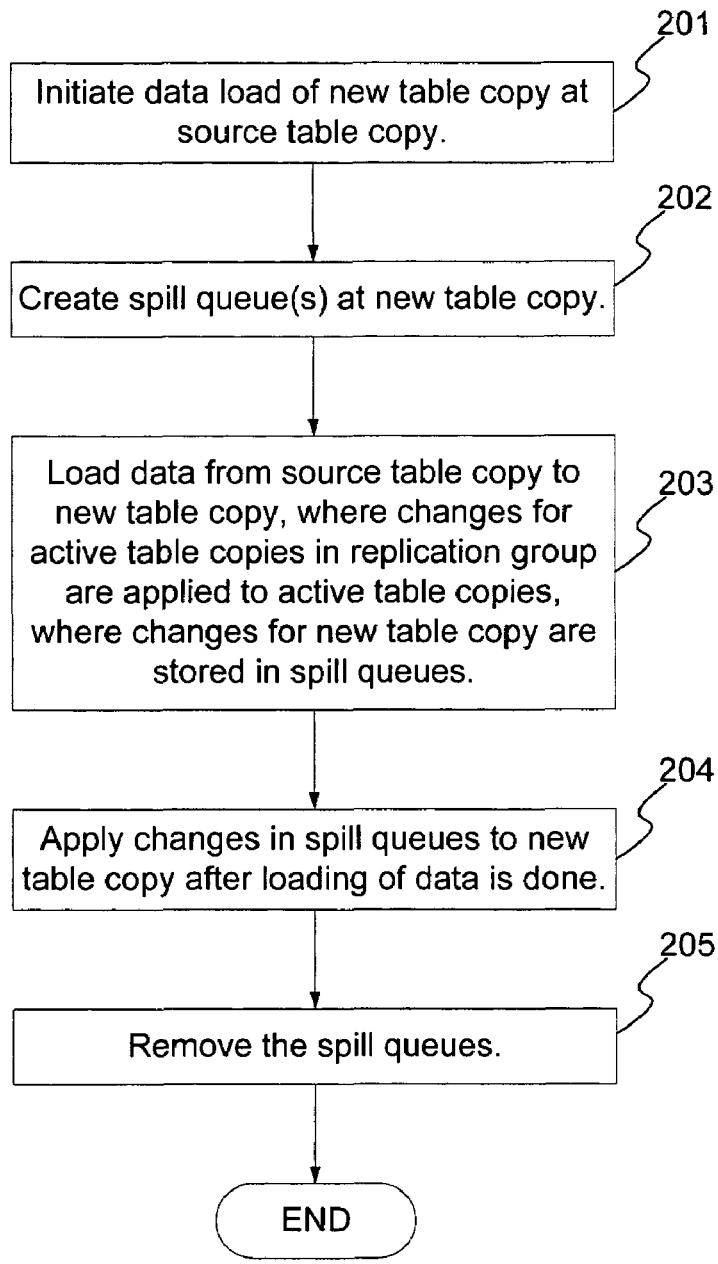
FIG. 2 is a flowchart illustrating an embodiment of a method for an automatic initial load of data to a new table copy concurrently with active replication to existing table copies in accordance with the present invention.

FIG. 2 is a flowchart illustrating an embodiment of a method for an automatic initial load of data to a new table copy concurrently with active replication to existing table copies in accordance with the present invention. First, the load of a new table copy is initiated at a source table copy, via step 201. Any of the active table copies in the replication group can be designated as the source table copy. One or more spill queues 111 are then created at the new table copy, via step 202. In this embodiment, one spill queue is created for each table copy. However, multiple spill queues could be created for multiple table copies. The data is then loaded from the source table copy to the new table copy, where changes for the active table copies in the replication group are applied to the active table copies, but changes for the new table copy are stored on the spill queue 111, via step 203. Once the loading of data to the new table copy is done, the changes in the spill queue 111 are applied to the new table copy, via step 204. Once all changes in the spill queue 111 have been applied, the spill queue 111 is removed, via step 205.

In this embodiment, the loading of the data is performed by a load utility. The load utility can either be automatically called by Apply 107 when a new table copy subscription is activated (called an "internal load") or manually by an administrator (called an "external load"). If the loading of data is managed by Apply 107, the load utility can run in another thread of execution to let Apply 107 process changes for the other tables.

In this embodiment, the following signals are used during the load of data:
CAPSTART: start capturing changes for a given table;
LOAD DONE: load utility for a given table has completed.

In this embodiment, the following messages are exchanged between Capture 103 and Apply 107 via the administrative queue 105:
SCHEMA: changes have started to be captured by Capture 103 for a specific subscription (sent from Capture 103 to Apply 107);
TRANSACTION: message containing row changes for one or more table copies, corresponding to the changes of a transaction as executed at the source database 101 (sent from Capture 103 to Apply 107);
LOAD DONE: message indicating the completion of the load utility (when sent from Apply 107 to Capture 103) or acknowledging the completion of the load utility (when sent from Capture 103 to Apply 107) for a specific subscription;
SPILLED ROW: row change for an individual table copy, used by Apply 107 to store changes that occurred during the loading of data. Such messages are inserted and read from the spill queues 111.

In this embodiment, Capture 103 and Apply 107 use specific states to remember the stage of the data load. These states allow the protocol to resume in case of shutdown or crash instead of restarting from scratch.

Table 1 illustrates the states used by Capture 103 for a given table copy being replicated:

TABLE 1

| State Name | Meaning |
|---|---|
| INACTIVE | No changes are captured for this table (initial state) |
| LOADING | A load utility is being used to copy the source table copy's current state to the target table copy, changes are captured and sent. |
| ACTIVE | Changes are captured and sent. |

Table 2 illustrates the states used by Apply 107 for a given table copy being replicated:

TABLE 2

| State Name | Meaning |
|---|---|
| INACTIVE | No changes are applied for this table (initial state) |
| EXTERNAL_LOADING | Load utility is running, load utility is not controlled by Apply |
| INTERNAL_LOADING | Load utility is running, load utility is controlled by Apply |
| LOAD_UTILITY_DONE | Load utility has completed and Apply is ready to send LOADDONE message to Capture (internal load only) |
| LOAD_FINISHING | Applying changes from spill queues |
| TERMINATING | Stop applying changes because of an error |
| ACTIVE | Table loaded, changes are applied directly to it |

Figure 3:
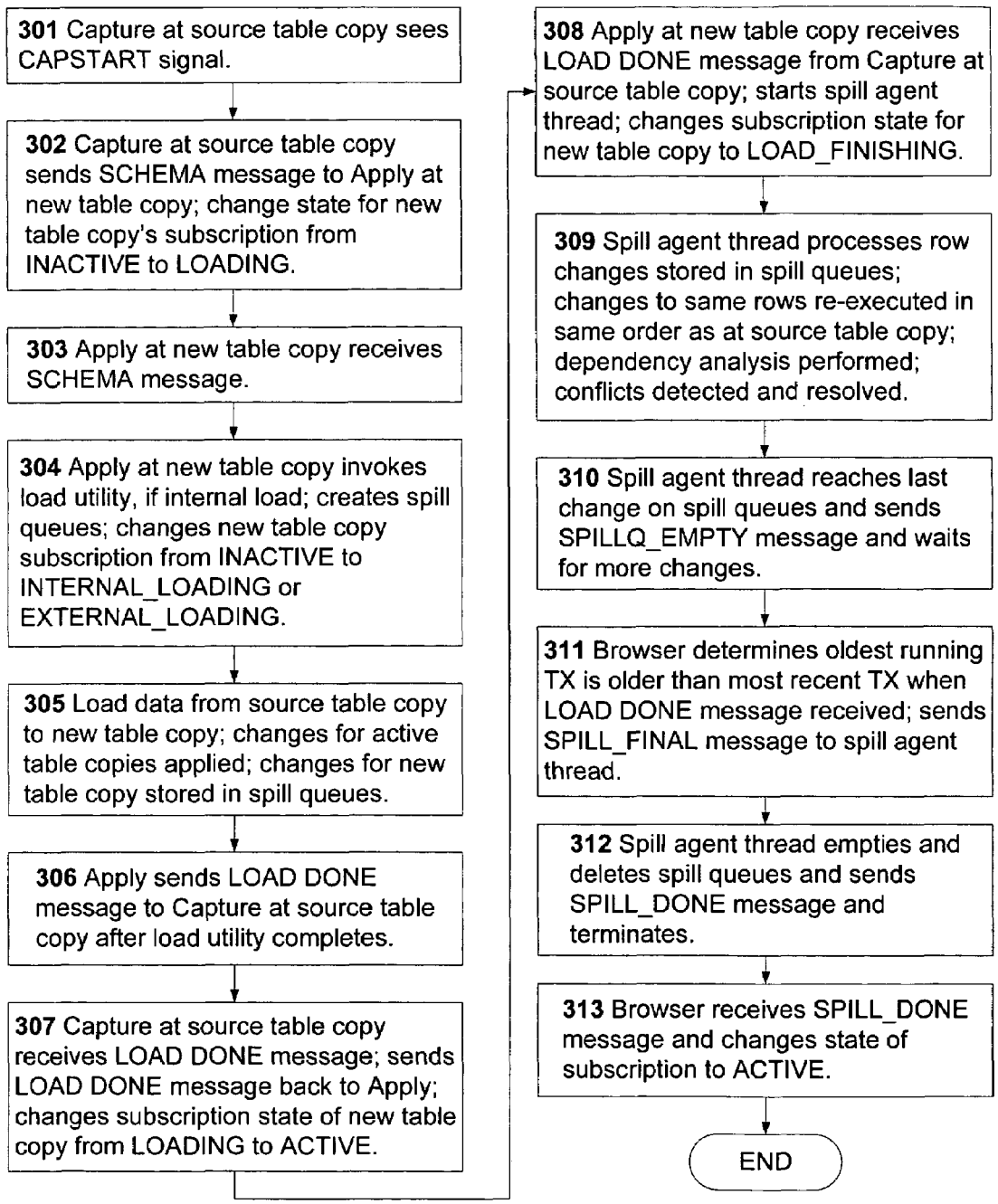
FIG. 3 is a flowchart illustrating in more detail the embodiment of the method for an internally controlled initial load of data to a new table copy concurrently with active replication to existing table copies in accordance with the present invention.

FIG. 3 is a flowchart illustrating in more detail the embodiment of the method for an internally controlled initial load of data to a new table copy concurrently with active replication to existing table copies in accordance with the present invention. First, Capture 103 at the source table copy sees the CAPSTART signal, via step 301, in its signal table. Capture 103 then sends a SCHEMA message to Apply 107 at the new table copy, via step 302. The SCHEMA message contains information about the source table copy and how changes will be encoded. At this point, Capture 103 changes the state for the new table copy's subscription from INACTIVE to LOADING. In this embodiment, this state change is synchronized with the sending of the SCHEMA message to avoid an inconsistent state in case Capture 103 shuts down or crashes.

Apply 107 at the new table copy receives the SCHEMA message from Capture 103, via step 303. Apply 107 then processes the SCHEMA message and invokes the load utility, if an internal load is specified in the SCHEMA message, to start copying the data in the source table copy to the new table copy, via step 304. Apply 107 also creates one spill queue 111 to accumulate and store the incoming changes for the new table copy for the duration of the data load. In this embodiment, the spill queues 111 are persistent queues, and one spill queue is created for each loading table copy in the replication group. Actions taken upon reception of the SCHEMA message are synchronized with a state change from INACTIVE to EXTERNAL_LOADING or INTERNAL_LOADING, depending on the type of load specified in the SCHEMA message.

The data from the source table copy is then loaded into the new table copy until done, via step 305. Changes in incoming transactions for already active table copies are applied to the active table copies. However, changes in incoming transactions for the new table copy are stored in the spill queues 111. In other words, no changes by user applications are applied against the new table copy during the time the load utility runs, but changes against existing active table copies are applied. Thus, replication between the active table copies in the replication group are not suspended during the data load for the new table copy.

When the load utility completes for an internal load, Apply 107 sends a LOAD DONE message to Capture 103 at the source table copy over the administration queue 105, via step 306. At this point, Apply 107 also changes its subscription state for the new table copy to LOAD_UTILITY_DONE. This is so that in the case of a restart, the load utility is not run again.

When Capture 103 at the source table copy receives the LOAD DONE message, it changes its sending mode to include before/unchanged values if the user selects this option. This guarantees that Capture 103 changes its policy after it has processed all the changes that occurred before the load utility completed, as described further later in this specification. Capture 103 also tags changes to rows if they occurred before the LOAD DONE message was received. In the case of an external load, a user or an external program inserts a LOAD DONE signal directly into Capture's signal table. Capture 103, upon seeing the LOAD DONE signal, sends back to Apply 107 the LOAD DONE message, via step 307, and changes its policies. When Apply 107 receives the LOAD DONE message, it can start applying the changes stored in the spill queues 111. Capture 107 also changes its subscription state for the new table copy from LOADING to ACTIVE, synchronized with the sending of the LOAD DONE message back to Apply 107.

Apply 107 at the new table copy next receives the LOAD DONE message from Capture 103 at the source table copy, via step 308, and starts the spill agent thread, and changes its subscription state to LOAD_FINISHING. The spill agent thread is responsible for processing the row changes stored in the spill queues 111. A possible optimization in case of an internal load is to reuse the thread used to run the load utility to be the spill agent thread. Also in the case of an internal load, the spill queue 111 can be processed as soon as the LOAD DONE message is sent to Capture 103.

The spill agent thread then processes the row changes stored in the spill queues 111, via step 309. Changes occurring to the same row of a given table copy are re-executed at the new table copy in the same order so that the same result is produced, although changes for different rows inserted into the spill queues 111 may not be in their source order because of the parallel nature of Apply 107. During the processing, Apply 107 performs dependency analysis between row changes in order to guarantee that a later change for a given row is spilled after any earlier change. This order is preserved even for changes occurring after the LOAD DONE message. Row changes received subsequent to the LOAD DONE message continues to be inserted into the spill queue instead of being applied directly to the new table copy.

Also during processing, Apply 107 detects and resolves any conflicting changes. Recall from above that no changes by user applications are allowed against the new table copy during the time the load utility ran. However, because the load utility ran while changes were occurring at the source table copy, the result of some of these changes could have been copied by the load utility. This would create conflicts when Apply 107 re-executes these changes from the spill queues 111 that occurred while the load utility was running. In this embodiment, Apply 107 tolerates the following conflicts:

Row not found when replicating a delete (the load utility didn't copy the row because it was already deleted);
Row not found when replicating an update (the row might have been deleted or modified before being seen by the load utility);
Row already there when performing an insert (change already copied by the load utility);
Old row not there and/or new row already there, in case of a key update change.

Alternatively, Apply 107 can resolve conflicts in the following way:

ignoring a change to a row not found when replicating a delete;
transforming a conflicting update into a row insert when the row is not found;
transforming a conflicting insert into an update when the row is present.

When the spill agent thread reaches the last change on the spill queues 111, it sends an Inter Thread Communication (ITC) message to the browser thread 108 called SPILLQ_EMPTY and waits for a response or for other row(s) to be inserted into the spill queue 111, via step 310. If other rows are inserted into the spill queue 111, the spill agent thread processes them and sends the same ITC message once the spill queue becomes empty again. The browser thread 108 keeps track of the in-flight transactions. Once the oldest running transaction is older than the most recent one when the LOAD DONE message was received, i.e., all in-flight transactions before the LOAD DONE message have been processed, the browser thread 108 sends a SPILL_FINAL ITC message to the spill agent thread, via step 311. This message tells the spill agent thread that it can safety delete its spill queue 111 when it is empty. The spill agent thread then empties and deletes the spill queues 111, via step 312, and sends a SPILL_DONE message and terminates. The browser thread 108 receives the SPILL_DONE message and deletes the LOAD DONE message, via step 313, and changes the state of the subscription to ACTIVE. At this point, the initial data load process for the new table copy is completed. The reason for the browser to wait till all in-flight transactions that came before the LOAD DONE message are applied is to guarantee that all changes tagged as being captured before the LOAD DONE are handled by the spill agent with the previously mentioned conflict handling rules. Other ways of tracking the tagged transactions can be used. For example, a counter could be used, where the counter is incremented each time a row arrives, and decremented once it has been spilled (in addition to checking that the LOAD DONE message has been seen).

According to the present invention, the messages for the changes in the spill queues 111 are deleted (FIG. 3, step 312) in the same transaction as the database changes they induce. One technique to accomplish this is a two-phase commit, where the process managing the spill queues 111 and the database process synchronize their commits. However, in some cases where high throughput and low latency needs to be achieved, the two-phase commit protocol may become a performance bottleneck. Thus, in this embodiment of the present invention, instead of using the two-phase commit protocol, Apply 107 uses some specific database tables to store reliably temporary information:

DoneMsg: This table is used to remember the message identifier (or msgid) of the message that has been processed. This table contains two columns: the queue name and the message identifier.

SpilledRows: This table is used to keep track of the transaction row that has been spilled. If a message is present in the spill queues 111, but doesn't have an entry in the SpilledRows table, it means Apply 107 has shut down in the middle of its processing. Only messages from the spill queues 111 with a corresponding entry in the SpilledRows table are applied to the new table copy. This table contains two columns: the spill queue name and the message identifier in the spill queue 111.

The following is an example algorithm for the application of transactions by Apply 107:

```
//apply trans:
for each row in trans
    if (row.sub.state == loading)
        rowsHave BeenSpilled = true
        msgid = MQPUT (spillq, row)
        //means insert a message into a spill queue of
        //table
        if spill queue gone
            apply (row)
        else
            INSERT INTO SpilledRow VALUES
                (row.sub.spillq.name, msgid)
        endif
    else
        //replay the change represented by this row
        apply (row)     endif
endloop
//Commit spill queue:
if (rowsHave BeenSpilled)
    MQCMT //means commit the change to all queues
endif
//Log recovery info:
for each msgOfTrans
    INSERT INTO DoneMsg (qname, mqmsgid, msgseq)
        values (this.recvq, mqmsgid,msqseq)
endloop
DBCMT //means commit changes to all database tables
```

A transaction from the source table copy may be broken into multiple messages. In such a case, an agent thread 109 doesn't process the transaction until all the messages composing this transaction have arrived. Once a msgid has been inserted and committed into the DoneMsg table, it can be safely deleted from the receive queue, either by the agent itself or by a background process.

In the case where a background process is used, the browser thread 108 needs to make sure all processed messages are deleted before it starts processing messages from the queue.

The following is an example algorithm for the spill agent in processing each row from the spill queue:

```
messageId (messageId, row) = MQGET_Destructive (spillq)
    //MQGET means read a message from a queue
DELETE FROM SpilledRows WHERE qname = spillq
    AND msgid = messageId
if (noRowFound) then
    //ignore this row change
else
    apply (row)
    if (conflictOnApply)
        if (row.beforeLoadDone)
            forceTheChange
        else
            executeConflictHandling (row, sub)
        endif
    endif
...
if timeToCommit( ) then
    //typically multiple rows are batched per commit
    DBCMT //means commit changes to all database tables
    MQCMT //means commit the change to all queues
endif
```

In this algorithm, because the apply agent inserting into the SpilledRows table will hold an exclusive lock on the inserted row from the time of the insert (i.e., before MQCMT), if the apply agent does a MQCMT, the spill agent will be able to see the spilled row message in the SPILLQ doing a MQGET. Before the apply agent does the DBCMT, the spill agent will wait on the exclusively locked row until the apply agent commits. The spill agent will remove 'orphan' spill row messages. This mechanism ensures that (1) a spilled row is applied once and only once, and (2) a spilled row can't be applied before the rest of the transaction it belonged to is committed.

In the case where the new table copy has been partially loaded, or replication has momentarily been stopped, it could be possible to use a special load utility to analyze the differences between the source table copy and the new table copy, and to transfer only the missing and different rows (as well as deleting rows existing only at the new table copy). The spilling of changes would remain as described above. This would lead to a faster load period because less data is moved between the source table copy and the new table copy.

Although the embodiment of the present invention is described above with the load initiated by a user or by Apply, one of ordinary skill in the art will understand that other means of initiating the load can be used without departing from the spirit and scope of the present invention. For example, Capture 103 can spawn a special load thread that reads all rows from the source table copy using a SQL cursor, and sends those changes in special messages over the transaction queue 106 or a dedicated queue. Apply 107 would read those changes and hand them over to the agent threads 109 or dedicated loading threads. No transaction dependency analysis would be required for those changes that are only inserts. One advantage of this method is to not required a separate load utility or connectivity other than the queue between the source table copy and the new table copy. The rest of the spill queue handling and load handle would remain as described above.

In the case where a load utility supports a semantic such as "load all changes till a given point in the log file", the following variations are possible. Capture 103 stores the point in the recovery log 102 to which the load utility will go. Here, Apply 107 doesn't need to create a local spill queue. Instead, once the load utility has completed, Capture 103 could create a special thread reading from the given point in the recovery log to a special queue from which the Apply spill agent could read directly. Once the special catch-up thread in Capture 103 has caught up with the mainline thread, it can stop itself and let the mainline thread send changes for the new table copy as part of their original transactions. At Apply 107, the mechanism to stop processing the spill queue remains as described above. This method is more space efficient because changes occurring during the load do not need to be stored on the target server.

The embodiment of the present invention is described above as adding a new replication subscription/new table copy to a replication group, where some table copies are already being replicated. However, in some circumstances, a group of table copies start to be replicated at the same time or even a whole database. In such a case, the following techniques could be applied in addition to the above to improve system resource usage and overall performance:

If all table copies for a given browser thread are loaded at the same time or don't have a load phase, individual spill queues are not needed. The main transaction queue could be uses to delay applying transactions before all the load utilities (or one load utility loading all the table copies at the same time) have completed. Having a way to suspend Capture 103 would avoid filling up the transaction queue.

Schedule the load so that they don't all occur at the same time by:

using a special FIFO list of subscriptions to be loaded and by pooling of spill agents of a fixed number of threads which are reused as soon as they have finished loading a special target table copy. Such list can be maintained in Capture 103. The list waits for a special messages from Apply 107 before sending a SCHEMA message for the next subscription to activate. This list could also be maintained in Apply 107 by using a special state for subscriptions that are ready but have not yet started to be loaded;

Apply 107 can consider loading in parallel only a given number of subscriptions. In such case it records the schema messages it has seen for the additional subscriptions once the maximum number of parallel loading subscription has been reached. SCHEMA messages are not consumed. As spill agents complete the additional SCHEMA messages can be consumed;

Another control mechanism can be the maximum number of rows that can be loaded in parallel. Before starting the load operation, Apply 107 gets an estimate of the number of rows to be loaded by connecting to the source system. The load operation will be started only if the row estimate plus the number of rows already being loaded is less than the maximum.

All the above techniques can themselves be combined.

Figure 4:
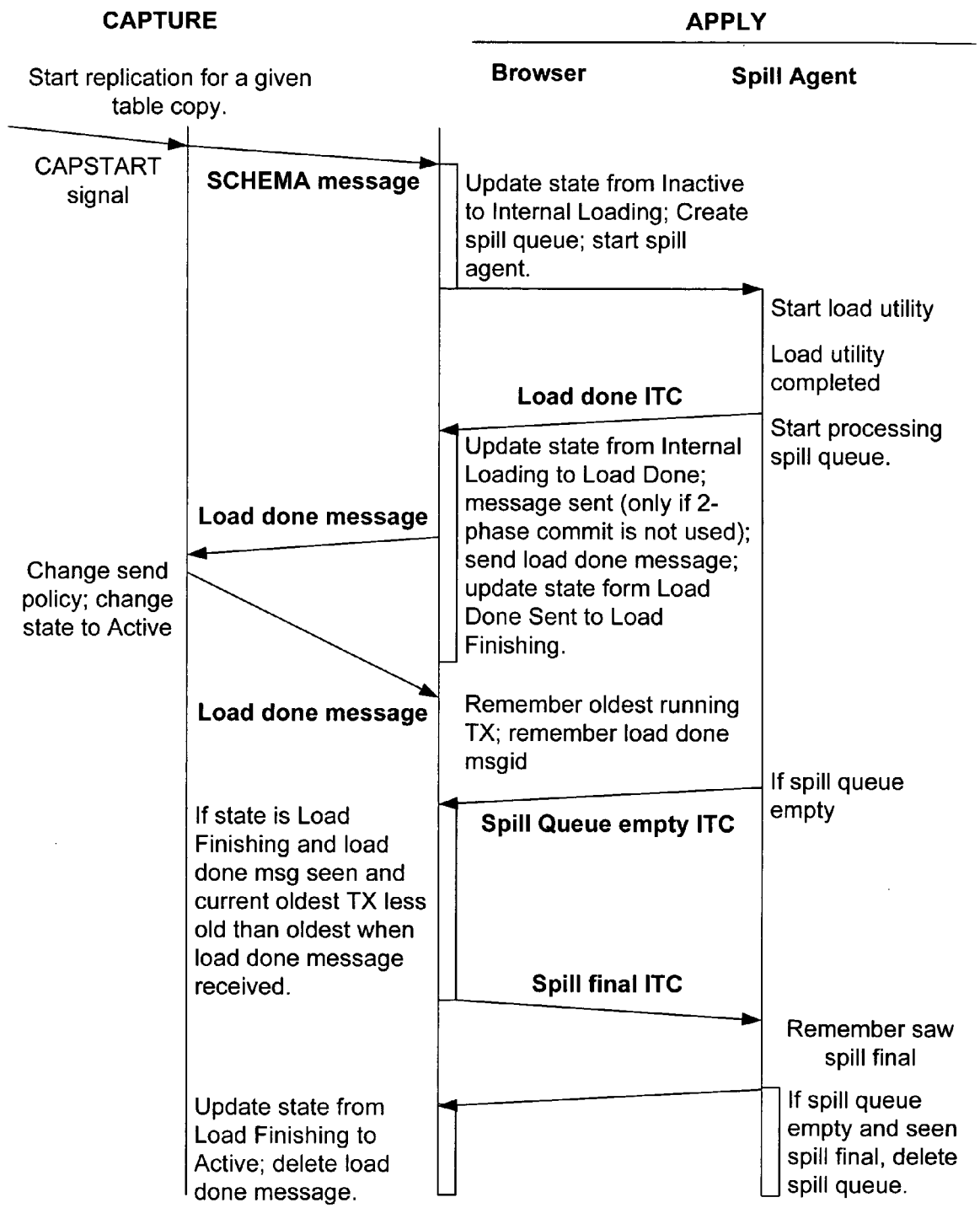
FIGS. 4 and 5 are sequence diagrams illustrating the various message, signals, and ITC message exchanged between Capture and Apply and between the various threads of Apply in accordance with the present invention.
Figure 5:
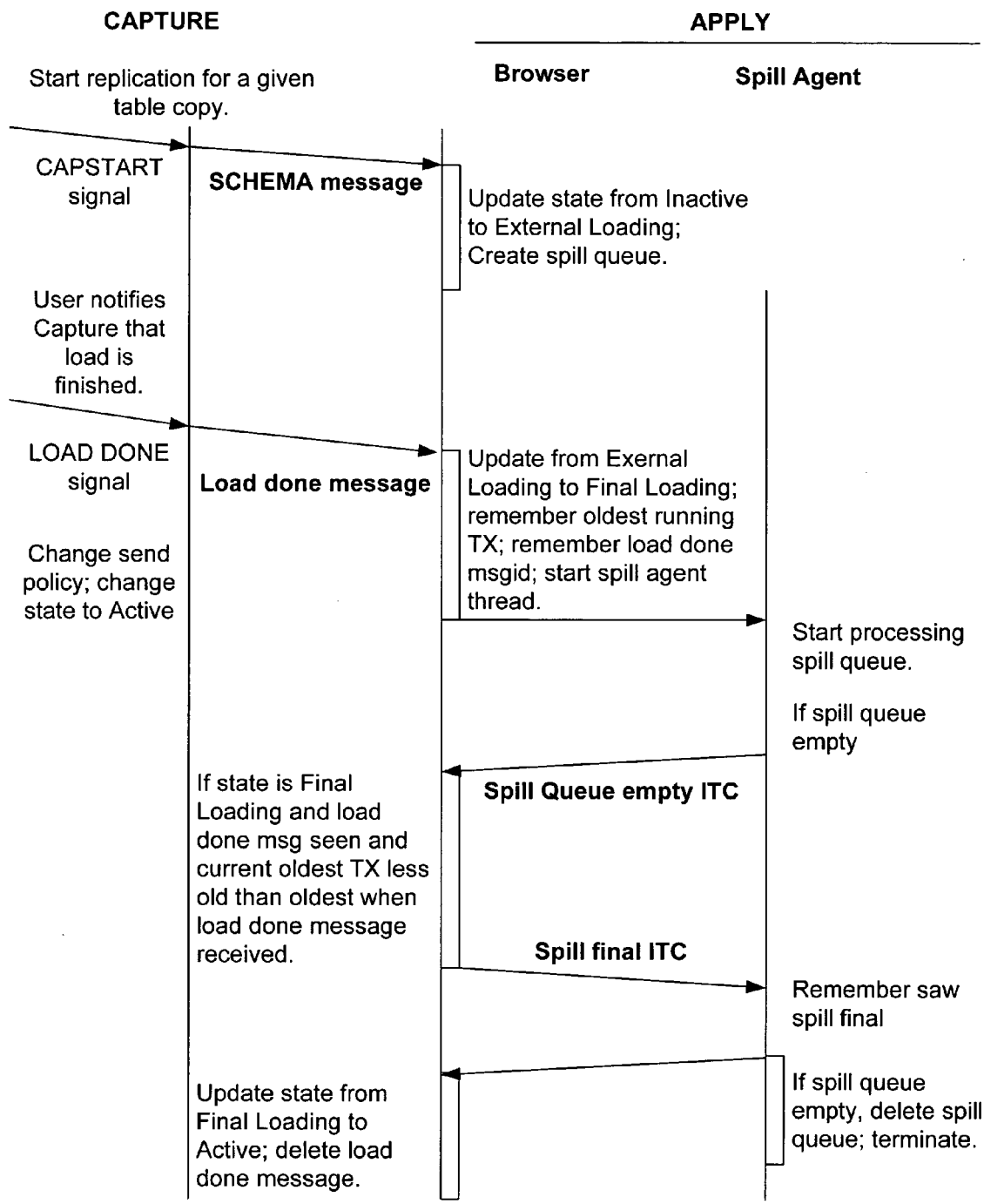

FIGS. 4 and 5 are sequence diagrams illustrating the various message, signals, and ITC message exchanged between Capture and Apply and between the various threads of Apply in accordance with the present invention. FIG. 4 is the sequence diagram for an internal load, while FIG. 5 is the sequence diagram for an external load.

A method and system for an automatic initial load of data to a new table copy concurrently with active replication to existing table copies have been disclosed. The method and system includes: initiating a data load of the new table copy; creating a spill storage area at the new table copy; loading the data from a source table copy to the new table copy, where changes for the active table copies are applied during the loading, but changes to the new table copy are stored in the spill storage area; applying the changes in the spill storage area to the new table copy after the loading of the data is done; and removing the spill storage area after the changes in the spill queue(s) have been applied to the new table copy. Thus, a new table copy is initialized into the replication group without requiring that replication be suspended at the source or any of the existing table copies during the initializing process.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method of loading data into a new table copy, the new table copy to be added to a database replication group including a plurality of pre-existing table copies, the method comprising:

loading data from a source table copy into the new table copy, the source table copy being one of the plurality of pre-existing table copies in the database replication group;

concurrent to the loading of the data into the new table copy, simultaneously applying changes of a user application received during the loading of the data to the plurality of pre-existing table copies in the database replication group including the source table copy; and creating a spill storage area at the new table copy and storing the changes of the user application in the storage spill area without applying the changes of the user application to the new table copy; and upon completion of the loading of the data into the new table copy, applying the changes stored in the spill storage area to the new table copy, wherein applying the changes of the user application stored in the spill storage area to the new table copy comprises, receiving a load done message at the new table copy;

starting a spill agent thread at the new table copy;

changing a state of the subscription of the new table copy at the new table copy to "load finishing"; and the spill tread agent processing the changes of the user application stored in the spill storage area.

2. The method of claim 1, wherein for an internal data load, a thread used to load the data is reused as the spill agent thread.

3. The method of claim 1, wherein the spill tread agent processing the changes of the user application stored in the spill storage area comprises:

re-executing the changes of the user application to a same row at the new table copy in a same order as previously executed at the source table copy;

identifying and resolving dependencies between the changes of the user application to the same row; and detecting and resolving conflicts between the changes of the user application to the same row.

4. The method of claim 3, wherein re-executing the changes of the user application to a same row at the new table copy comprises:

deleting each re-executed change from the spill storage area in a same transaction as the re-execution the change.

5. The method of claim 4, wherein the deletion of each re-executed change is performed with a two-phase commit protocol.

6. The method of claim 4, wherein deleting each re-executed change comprises:

storing a message identifier for the re-executed change at the new table copy, wherein upon a restart of the loading of the data into the new table copy in response to a shutdown or crash, only changes from the spill storage area without a corresponding stored message identifier are applied to the new table copy.

7. The method of claim 3, wherein detecting and resolving conflicts comprises:

ignoring a change to a row not found in the new table copy when re-executing a conflicting row delete;

ignoring a change to a row not found in the new table copy when re-executing a conflicting row update;

ignoring a change to a row in the new table copy when re-executing a conflicting row insert; and ignoring a change to an old row not found or a new row found in the new table copy when re-executing a conflicting key update.

8. The method of claim 3, wherein detecting and resolving conflicts comprises:

ignoring a missing row in the new table copy when re-executing a row delete;

transforming a re-execution of an update into a row insert when a row in the new table copy is missing; and transforming a re-execution of an insert into an update when a row in the new table copy already exists.

9. A computer readable medium with program instructions, tangibly stored thereon, for loading data into a new table copy, the new table copy to be added to a database replication group including a plurality of pre-existing table copies, the computer readable medium comprising instructions for:

loading data from a source table copy into the new table copy, the source table copy being one of the plurality of pre-existing table copies in the database replication group;

concurrent to the loading of the data into the new table copy, simultaneously applying changes of a user application received during the loading of the data to the plurality of pre-existing table copies in the database replication group including the source table copy; and creating a spill storage area at the new table copy and storing the changes of the user application in the storage spill area without applying the changes of the user application to the new table copy; and upon completion of the loading of the data into the new table copy, applying the changes stored in the spill storage area to the new table copy, wherein the instructions for applying the changes of the user application stored in the spill storage area to the new table copy comprises instructions for, receiving a load done message at the new table copy;

starting a spill agent thread at the new table copy;

changing a state of the subscription of the new table copy at the new table copy to "load finishing"; and the spill tread agent processing the changes of the user application stored in the spill storage area.

10. The computer readable medium of claim 9, wherein for an internal data load, a thread used to load the data is reused as the spill agent thread.

11. The computer readable medium of claim 9, wherein the instructions for the spill tread agent processing the changes of the user application stored in the spill storage area comprises instructions for:

re-executing the changes of the user application to a same row at the new table copy in a same order as previously executed at the source table copy;

identifying and resolving dependencies between the changes of the user application to the same row; and detecting and resolving conflicts between the changes of the user application to the same row.

12. The computer readable medium of claim 11, wherein the instructions for re-executing the changes of the user application to a same row at the new table copy comprises instructions for:

deleting the re-executed change from the spill storage area in a same transaction as the re-execution.

13. The computer readable medium of claim 12, wherein the instructions for deleting each re-executed change comprises instructions for:

performing the deletion of each re-executed change using a two-phase commit protocol.

14. The computer readable medium of claim 12, wherein the instructions for deleting each re-executed change comprises instructions for:

storing a message identifier for the re-executed change at the new table copy, wherein upon a restart of the loading of the data into the new table copy in response to a shutdown or crash, only changes from the spill storage area without a corresponding stored message identifier are applied to the new table copy.

15. The computer readable medium of claim 11, wherein the instructions for detecting and resolving conflicts comprises instructions for:

ignoring a change to a row not found in the new table copy when re-executing a conflicting row delete;

ignoring a change to a row not found in the new table copy when re-executing a conflicting row update;

ignoring a change to a row in the new table copy when re-executing a conflicting row insert; and ignoring a change to an old row not found or a new row found in the new table copy when re-executing a conflicting key update.

16. The computer readable medium of claim 11, wherein the instructions for detecting and resolving conflicts comprises instructions for:

ignoring a missing row in the new table copy when re-executing a row delete;

transforming a re-execution of an update into a row insert when a row in the new table copy is missing; and transforming a re-execution of an insert into an update when a row in the new table copy already exists.

17. A system comprising:

an asynchronous database replication group including a plurality of pre-existing table copies;

a new table copy to be added to the asynchronous database replication group;

a load utility to load data from a source table copy into the new table copy, the source table copy being one of the plurality of pre-existing table copies in the asynchronous database replication group;

concurrent to the load utility loading the data from the source table copy into the new table copy, an apply module to simultaneously apply changes of a user application received during the loading of the data to the plurality of pre-existing table copies in the replication group including the source table copy; and create a spill storage area at the new table copy and store the changes of the user application in the storage spill area without applying the changes of the user application to the new table copy; and upon completion of the loading of the data into the new table copy, the apply module to apply the changes of the user application stored in the spill storage area to the new table copy; and remove the spill storage area from the new table copy after the changes stored in the spill storage area have been applied to the new table copy.

* * * * *